(12) United States Patent
Jung et al.

(10) Patent No.: US 10,923,737 B2
(45) Date of Patent: Feb. 16, 2021

(54) SEPARATOR, AND FUEL CELL STACK COMPRISING THE SAME

(71) Applicant: LG CHEM, LTD., Seoul (KR)

(72) Inventors: Hye Mi Jung, Daejeon (KR); Jae Choon Yang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 106 days.

(21) Appl. No.: 16/320,416

(22) PCT Filed: Aug. 9, 2017

(86) PCT No.: PCT/KR2017/008606
§ 371 (c)(1),
(2) Date: Jan. 24, 2019

(87) PCT Pub. No.: WO2018/030778
PCT Pub. Date: Feb. 15, 2018

(65) Prior Publication Data
US 2020/0287223 A1    Sep. 10, 2020

(30) Foreign Application Priority Data
Aug. 12, 2016    (KR) ........................ 10-2016-0102844

(51) Int. Cl.
*H01M 8/0254* (2016.01)
*H01M 8/026* (2016.01)
*H01M 8/1004* (2016.01)

(52) U.S. Cl.
CPC ......... *H01M 8/0254* (2013.01); *H01M 8/026* (2013.01); *H01M 8/1004* (2013.01)

(58) Field of Classification Search
CPC .................................................. H01M 8/0254
See application file for complete search history.

(56) References Cited

U.S. PATENT DOCUMENTS

2013/0065156 A1    3/2013    Jeong

FOREIGN PATENT DOCUMENTS

| JP | 2009-140795 A | 6/2009 |
|---|---|---|
| JP | 2012-199093 A | 10/2012 |
| KR | 10-2003-0041219 A | 5/2003 |
| KR | 10-2003-0060668 A | 7/2003 |
| KR | 10-1241016 B1 | 3/2013 |
| KR | 10-2015-0076300 A | 7/2015 |
| KR | 10-1567224 B1 | 11/2015 |
| KR | 10-2017-0050689 A | 5/2017 |

OTHER PUBLICATIONS

International Search Report (PCT/ISA/210) issued in PCT/KR2017/008606, dated Nov. 17, 2017.

*Primary Examiner* — Ladan Mohaddes
(74) *Attorney, Agent, or Firm* — Birch, Stewart, Kolasch & Birch, LLP (57) ABSTRACT

A fuel cell including a separator having a plurality of unit bodies continuously arranged along a first direction and arranged apart at predetermined intervals along a second direction orthogonal to the first direction, wherein each of the unit bodies has a wedge shape having a first inclined surface and a second inclined surface, connected at a predetermined angle at a vertex portion and two unit bodies adjacent along the second direction are arranged so that each vertex portion is not coaxially located with respect to a virtual line parallel to the second direction.

19 Claims, 6 Drawing Sheets

→ Reaction gas flow
--▶ Condensed water discharge route

SEPARATOR, AND FUEL CELL STACK COMPRISING THE SAME

TECHNICAL FIELD

The present invention relates to a separator and a fuel cell stack comprising the same.

The present application claims the benefit of priority based on Korean Patent Application No. 10-2016-0102844 filed on Aug. 12, 2016, the disclosure of which is incorporated herein by reference in its entirety.

BACKGROUND ART

Generally, a fuel cell is an energy conversion device that generates electrical energy through an electrochemical reaction between a fuel and an oxidizer and has an advantage that power can be consistently generated as long as the fuel is continuously supplied.

A polymer electrolyte membrane fuel cell (PEMFC) using a polymer membrane capable of permeating hydrogen ions as an electrolyte, has a low operating temperature of about 100° C. or lower as compared to other types of fuel cells, and has advantages of high energy conversion efficiency, high output density and fast response characteristics. Besides, since it can be miniaturized, it can be provided as portable, vehicle and household power supplies.

The polymer electrolyte fuel cell stack may comprise a membrane-electrode assembly (MEA) having an electrode layer formed by applying an anode and a cathode, respectively, around an electrolyte membrane composed of a polymer material, a gas diffusion layer (GDL) serving to distribute reaction gases evenly over reaction zones and to transfer electrons generated by oxidation reaction of the anode electrode toward the cathode electrode, a separating plate (bipolar plate) for supplying the reaction gases to the gas diffusion layer and discharging water generated by the electrochemical reaction to the outside, and a rubber material gasket having elasticity disposed on the outer circumference of the reaction zone of the separating plate or the membrane-electrode assembly to prevent leakage of the reaction gases and the cooling water.

Conventional separators for a fuel cell stack are configured such that the flows of the reaction gas and the resulting water travel in the same direction through two-dimensional channels or are distributed and discharged through intersecting three-dimensional solid shapes. However, they have a structure that is not suitable for efficiently discharging a variable amount of water under various operation conditions, thereby having a problem of deteriorating the performance of the fuel cell stack.

Particularly, there is a technical problem that a water transfer (supply/generation/discharge) imbalance in the fuel cell occurs in the high output region and a high mass transfer resistance (usually diffusion resistance) of the reaction gas in the reaction surface occurs.

In addition, in the case of conventional separating plates, for example, separating plates applied by metal mesh, expanded metal, etc., transfer passages of the reaction gas and the condensed water (generated water) are not distinguished clearly, thereby resulting in problems of reduction in the reaction gas supply efficiency and performance instability due to the condensed water occlusion in the microchannel.

DISCLOSURE

Technical Problem

It is a problem to be solved by the present invention to provide a separator capable of directly transferring a reaction gas into an electrode surface, and a fuel cell stack comprising the same.

Also, it is a problem to be solved by the present invention to a separator capable of improving a reaction gas transmission rate and a water discharge performance, and a fuel cell stack comprising the same.

Furthermore, it is a problem to be solved by the present invention to provide a separator capable of sufficiently securing a contact area in contact with a gas diffusion layer and reducing a contact resistance simultaneously, and a fuel cell stack comprising the same.

In addition, it is a problem to be solved by the present invention to provide a separator capable of improving heat and mass transfer characteristics by a convection/dispersion mixing, and a fuel cell stack comprising the same.

Also, it is a problem to be solved by the present invention to provide a separator capable of effectively discharging condensed water, and a fuel cell stack comprising the same.

Furthermore, it is a problem to be solved by the present invention to provide a separator capable of improving reaction gas supply efficiency through efficient moisture management and preventing performance instability, and a fuel cell stack comprising the same.

Technical Solution

To solve the above-described problems, according to one aspect of the present invention, there is provided a separator comprising a plurality of unit bodies continuously arranged along a first direction and arranged apart at predetermined intervals along a second direction orthogonal to the first direction, wherein each of the unit bodies has a wedge shape having a first inclined surface and a second inclined surface, connected at a predetermined angle at a vertex portion and wherein two unit bodies adjacent along the second direction are arranged so that each vertex portion is not coaxially located with respect to a virtual line parallel to the second direction.

According to another aspect of the present invention, there is also provided a fuel cell stack comprising a membrane-electrode assembly, a gas diffusion layer provided on one side of the membrane-electrode assembly and a separator disposed so that at least some regions of the separator are in contact with the gas diffusion layer. Here, the separator comprises a plurality of unit bodies continuously arranged along a first direction and arranged apart at predetermined intervals along a second direction orthogonal to the first direction, wherein each of the unit bodies has a wedge shape having a first inclined surface and a second inclined surface, connected at a predetermined angle at a vertex portion and wherein two unit bodies adjacent along the second direction are arranged so that their respective vertex portions are not coaxially located with respect to a virtual line parallel to the second direction.

Advantageous Effects

As described above, the separator related to one embodiment of the present invention and the fuel cell stack comprising the same have the following effects.

The separator related to one embodiment of the present invention comprises a unit body having a plurality of inclined surfaces inclined at various angles with respect to an electrode surface, and has a shape in which a plurality of unit bodies are repeatedly cross-aligned along a predetermined direction. In addition, a region in contact with the gas diffusion layer may have a zigzag shape, and it is possible to increase shearing force due to a difference in flow velocity in the adjacent region in contact with the gas diffusion layer by contacting the wedge-shaped unit body, in which at least one of the inclined angle and the inclined area is different, with the gas diffusion layer.

Also, by inducing the convection/diffusion mixing flow of the reaction gas through the cross-aligned structure, the heat and mass transfer characteristics can be improved.

Furthermore, it is possible to sufficiently secure the contact area in contact with the gas diffusion layer and reduce the contact resistance (ohmic voltage loss reduction) simultaneously.

In addition, the condensed water (generated water) may also move along inclined surfaces and troughs of the unit bodies by gravity to cover water shortages, or may also be discharged to the outside of the stack by the drain hole.

MODE FOR INVENTION

Hereinafter, a separator according to one embodiment of the present invention and a fuel cell stack comprising the same will be described in detail with reference to the accompanying drawings.

In addition, the same or similar reference numerals are given to the same or corresponding components regardless of reference numerals, of which redundant explanations will be omitted, and for convenience of explanation, the size and shape of each constituent member as shown may be exaggerated or reduced.

Figure 1:
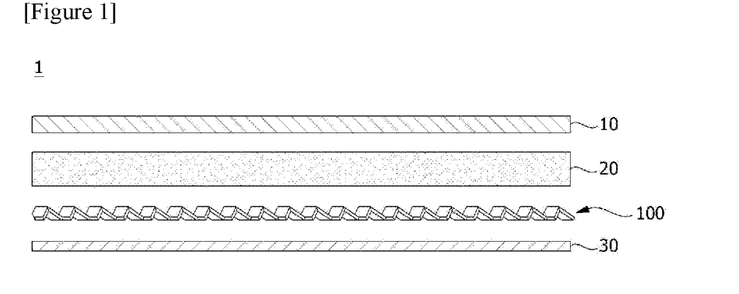
FIG. 1 is a cross-sectional view of a fuel cell stack related to one embodiment of the present invention.
Figure 2:
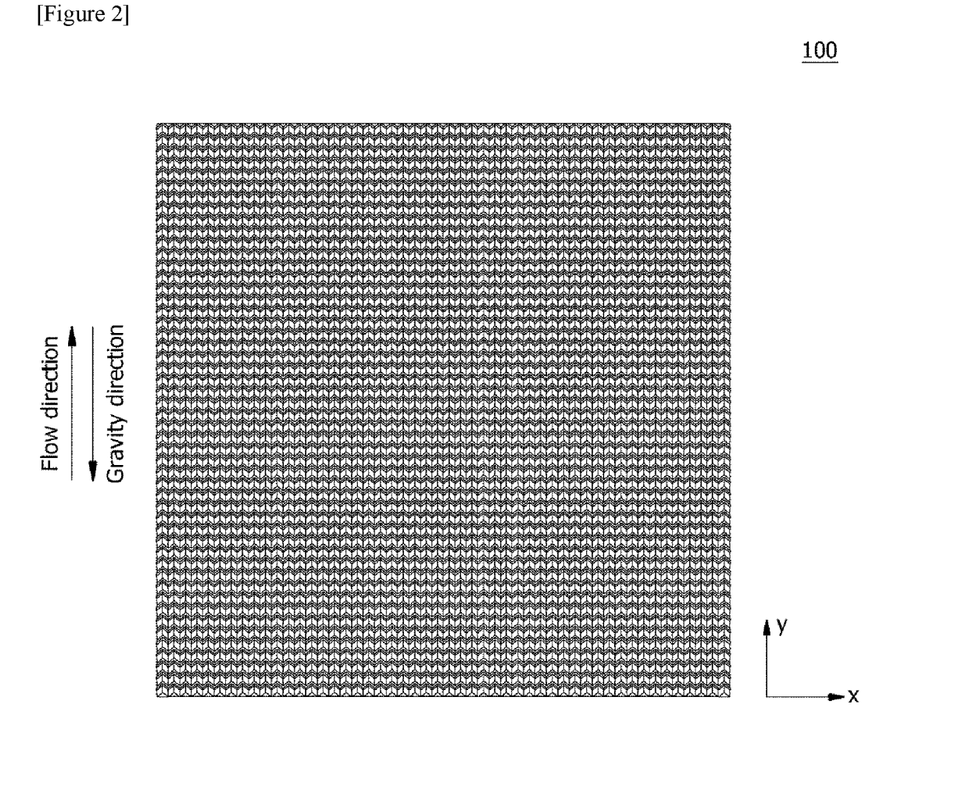
FIG. 2 is a plan view of a separator related to one embodiment of the present invention.
Figure 3:
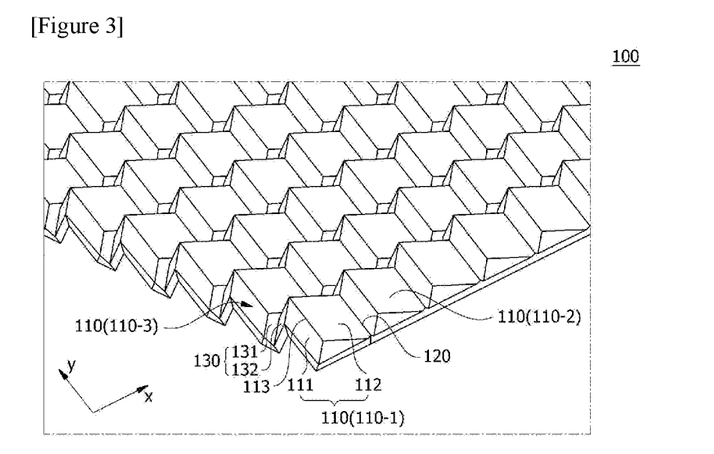
FIG. 3 is a perspective view of a separator related to one embodiment of the present invention.

FIG. 1 is a cross-sectional view of a fuel cell stack (1) related to one embodiment of the present invention, FIG. 2 is a plan view of a separator (100) related to one embodiment of the present invention, and FIG. 3 is a perspective view of a separator (100) related to the present invention.

Referring to FIG. 1, the fuel cell stack (1) related to one embodiment of the present invention comprises a membrane-electrode assembly (10), a gas diffusion layer (20) provided on one side of the membrane-electrode assembly (10) and a separator (100).

Furthermore, the separator (100) is disposed so that the gas diffusion layer (20) contacts in at least some regions.

Also, the fuel cell stack (1) comprises a bottom plate (30) disposed in a direction opposite to the gas diffusion layer (20) based on the separator (100).

Referring to FIGS. 2 and 3, the separator (100) comprises a plurality of unit bodies (110) continuously arranged along a first direction (x-axis direction) and arranged apart at predetermined intervals along a second direction (y-axis direction) orthogonal to the first direction.

The separator (100) has a first surface (plane) as shown in FIG. 2 and a second surface (back surface) opposite to the first surface, and may be a wave type plate continuously bent along the first and second directions.

Each of the unit bodies (110) has a plurality of inclined surfaces connected at a predetermined angle at a vertex portion (113). Specifically, each of the unit bodies (110) has a wedge shape having a first inclined surface (111) and a second inclined surface (112), connected at a predetermined angle at a vertex portion (113). At this time, the separator (100) is disposed such that the vertex portion (113) of each unit body (110) is in contact with the gas diffusion layer (20).

In addition, two unit bodies (110) (110-1, 110-3) adjacent along the second direction are arranged such that each vertex portion is not located coaxially with respect to a virtual line parallel to the second direction (y-axis direction). Specifically, the plurality of unit bodies (110) are disposed continuously along the first direction, and two unit bodies (110) (110-1, 110-3) adjacent along the second direction are arranged such that each vertex portion has a zigzag shape along the second direction (y-axis direction).

Also, a trough (120) is formed between two unit bodies (110-1, 110-2) adjacent along the first direction by the first and second inclined surfaces. For example, two unit bodies adjacent along the first direction comprise a first unit body (110-1) and a second unit body (110-2), where the second inclined surface (112) of the first unit body (110-1) and the first inclined surface of the second unit body (110-2) are connected so as to form a trough (120). In addition, the trough (120) may have a "V" shape. As described below, the trough (120) functions as a flow passage of condensed water (generated water).

Furthermore, the troughs formed between two unit bodies (110-1, 110-2) adjacent along the first direction are arranged in zigzags along the second direction.

The inclination angle of the first inclined surface (111) and the second inclined surface (112) can be defined as an angle tilted on the basis of a virtual plane having two axes (x axis, y axis) as the first direction and the second direction. For example, the virtual plane may be a bottom plate (30), and the inclination angles of the first inclined surface (111) and the second inclined surface (112) may each mean an angle tilted from the bottom plate (30) toward the gas diffusion layer (20).

The wedge-shaped unit bodies (110) may also be provided to have a symmetrical shape and may also be provided to have an asymmetric shape, based on the vertex portion (113).

For example, the first inclined surface (111) and the second inclined surface (112) may be formed to have inclination angles different from each other. Accordingly, the unit body (110) may be provided such that the wedge shape has a shape tilted in a predetermined direction. In addition, the first inclined surface (111) and the second inclined surface (112) may be formed to have areas different from each other.

The vertex portion (113) disposed to be in contact with the gas diffusion portion (20) may also be formed as a line, and may also be formed as a flat surface having a predetermined area through a rolling (planarization) process in terms of securing an electrical contact.

As described above, two unit bodies (110: 110-1, 110-3) adjacent along the second direction can be arranged apart at predetermined intervals. The separator (100) comprises a connecting portion (130) connecting two unit bodies (110-1, 110-3) adjacent along the second direction. At this time, the connecting portion (130) may be provided to be bent at least twice or more. For example, the connecting portion (130) may comprise at least two inclined portions (131, 132) for connecting the first inclined surfaces of two unit bodies (110-1, 110-3) adjacent along the second direction. Also, two adjacent inclined portions (131, 132) may be formed for at least one of inclination angles and areas to be different from each other. At this time, at least two or more of pluralities of inclined surfaces (111, 112) and inclined portions (131, 132), which are in contact with the gas diffusion layer (20) based on the vertex portion (113), may have inclination angles, inclined directions and areas, different from each other.

Figure 4:
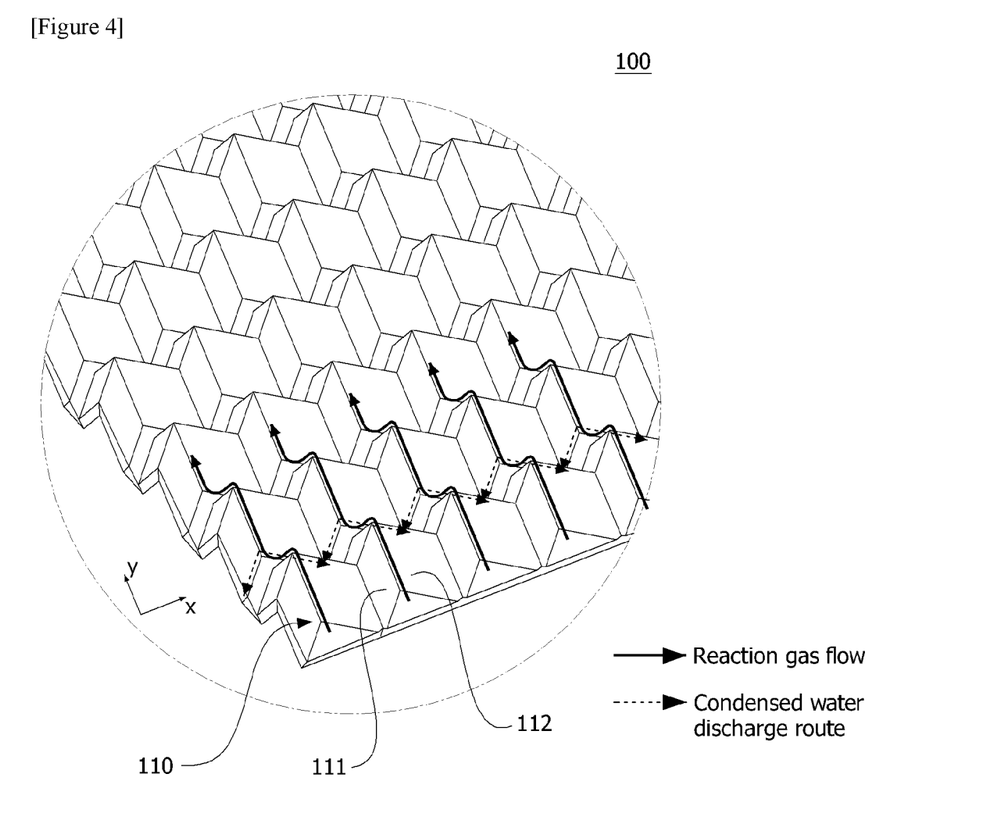
FIGS. 4 and 5 are perspective views for explaining flows of a reaction gas and condensed water in a separator constituting a fuel cell stack.
Figure 5:
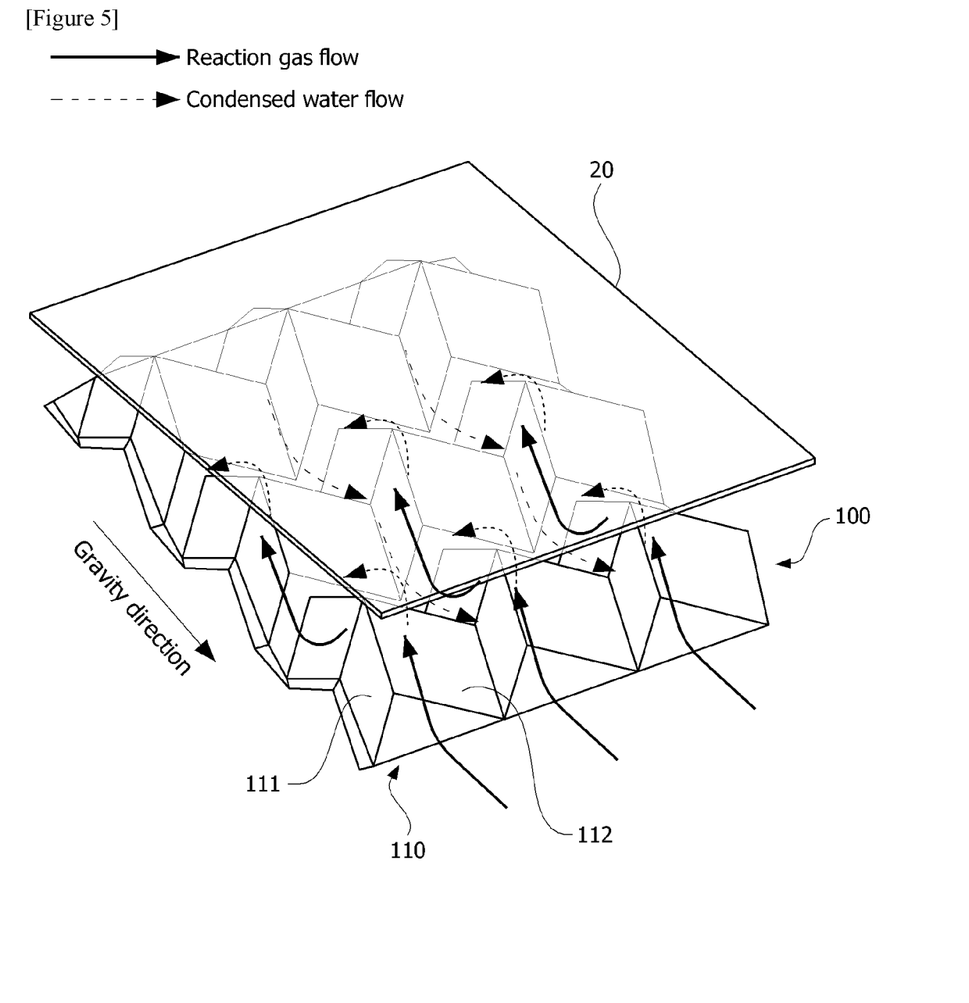

Also, FIGS. 4 and 5 are perspective views for explaining flows of a reaction gas and condensed water in a separator (100) constituting a fuel cell stack (1).

In the fuel cell stack (1), the separator (100) may be disposed so that the reaction gas flows along the second direction. At this time, the second direction may be a direction opposite to the gravity direction. Furthermore, the main flow direction of the reaction gas in the fuel cell stack (1) may be a direction opposite to the gravity direction. In addition, the flow direction of the condensed water (generated water) in the fuel cell stack (1) may be the gravity direction, and the main flow direction of the reaction gas and the main flow direction of the condensed water may be opposite to each other.

The reaction gas can move toward the gas diffusion layer (20) along the first inclined surfaces and the second inclined surfaces (111, 112) of the unit bodies (110) arranged along the second direction. Also, the reaction gas may flow, along the connecting portion (130), into the inclined surfaces of the unit bodies (110) arranged along the second direction. As described above, at least two or more of the pluralities of inclined surfaces (111, 112) and inclined portions (131, 132), which are in contact with the gas diffusion layer (20) based on the vertex portion (113) of any one unit body (110), may have inclination angles, inclined directions and areas, different from each other. At this time, the flow velocity difference of the reaction gas in the adjacent region in contact with the gas diffusion layer (20) occurs, whereby the shearing force can be increased. Also, the condensed water can be moved to the gravity direction along the connecting portions (130) and the troughs (120).

Up to now, the case where both the reaction gas and the condensed water move on the first surface of the separator (100) and do not move toward the second surface has been explained as an example. That is, the movement of the reaction gas and the condensed water is achieved only on the first surface of the separator (100) facing the gas diffusion layer (20). In such a structure, the condensed water moves to the gravity direction and may play a role of compensating for water shortages. As such, the structure formed so that all the flows can be made only on the first surface of the separator (100) can be applied to fuel battery cells/stacks for low humidification or non-humidification.

Figure 6:
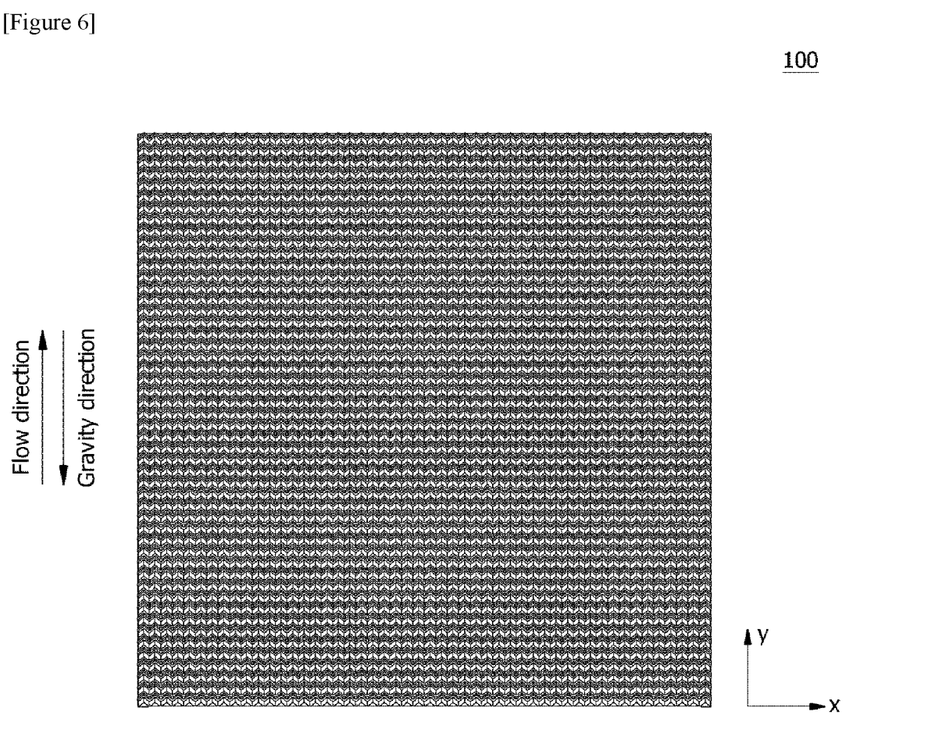
FIG. 6 is a plan view of a separator related to another embodiment of the present invention.
Figure 7:
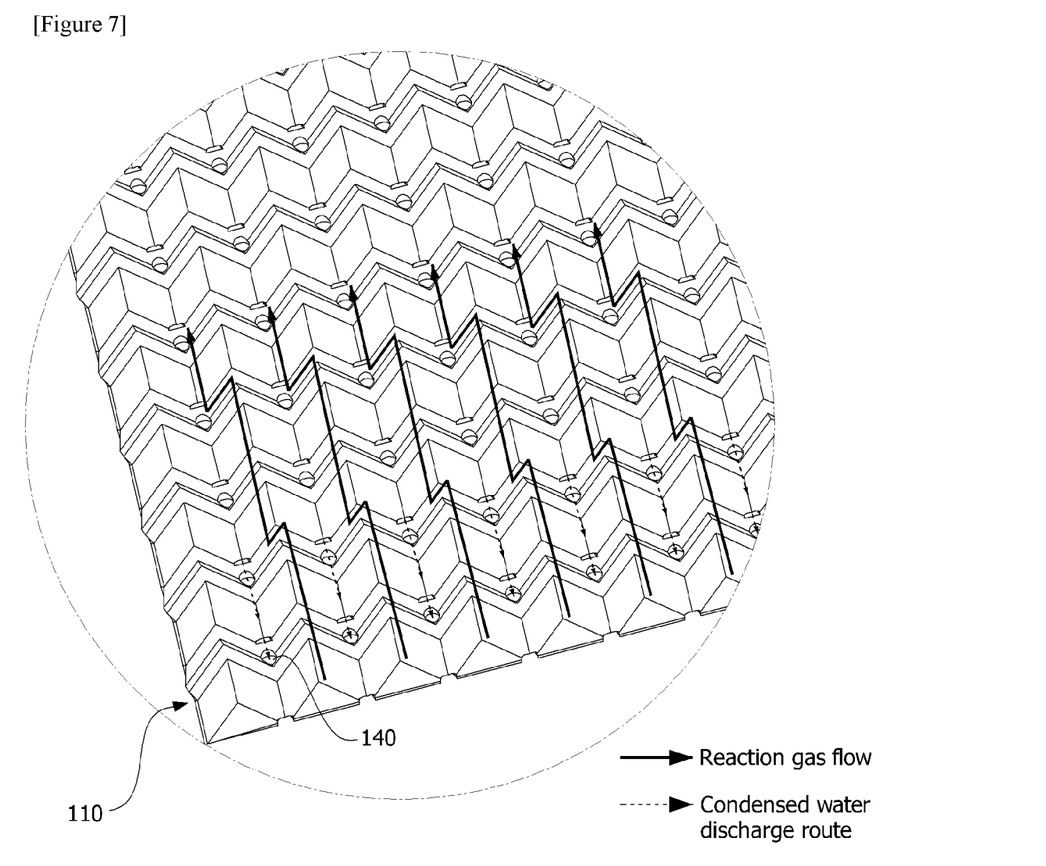
FIG. 7 is a perspective view for explaining flows of a reaction gas and condensed water in the separator depicted in FIG. 6.
Figure 8:
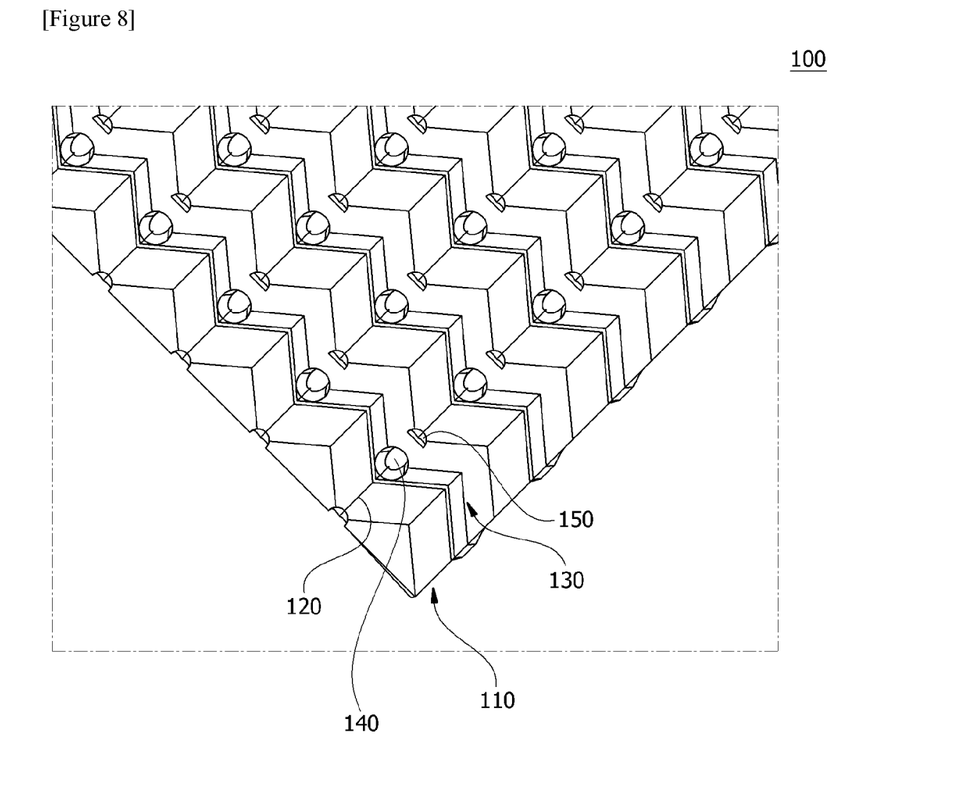
FIG. 8 is a perspective view of the separator depicted in FIG. 6.

FIG. 6 is a plan view of a separator (100) related to another embodiment of the present invention, FIG. 7 is a perspective view for explaining flows of a reaction gas and condensed water in the separator (100) depicted in FIG. 6, and FIG. 8 is a perspective view of the separator (100) depicted in FIG. 6.

Referring to FIGS. 6 to 8, a drain hole for flow of the condensed water may be formed in at least one of the trough (120) and the connecting portion (130). The drain hole is a through-hole passing through the first surface and the second surface of the separator (100). The shape of the drain hole may be variously formed in a circle, a polygon, a parallelogram, or the like.

Specifically, a first drain hole (140) may be formed in at least some regions of the connecting portion (130). In addition, a second drain hole (150) may be formed in at least some regions of the trough (120). The shape and size of the first drain hole (140) and the second drain hole (150) may also be formed to be the same or different from each other.

In such a structure, the condensed water moves to a space between the second surface of the separator (100) and the bottom plate (30) through the drain holes (140, 150), and can be discharged outside the fuel cell stack (1). As such, the structure of the separator (100) can be applied to medium/high humidification or high power fuel battery cells/stacks.

The preferred embodiments of the present invention as described above are disclosed for illustrative purposes, which can be modified, changed and added within thought and scope of the present invention by those skilled in the art and it will be considered that such modification, change and addition fall within the following claims.

INDUSTRIAL APPLICABILITY

According to the present invention, it is possible to improve the heat and mass transfer characteristics by inducing the convection/diffusion mixing flow of the reaction gas.

The invention claimed is:

1. A separator comprising a plurality of unit bodies continuously arranged along a first direction and arranged apart at predetermined intervals along a second direction orthogonal to the first direction and a connecting portion connecting two unit bodies adjacent along the second direction,
    wherein each of the unit bodies has a wedge shape having a first inclined surface and a second inclined surface, connected at a predetermined angle at a vertex portion,
    wherein two unit bodies adjacent along the second direction are arranged so that each vertex portion is not coaxially located with respect to a virtual line parallel to the second direction, and
    wherein the connecting portion comprises at least two inclined portions for connecting the first inclined surfaces of the two unit bodies adjacent along the second direction.

2. The separator according to claim 1,
    wherein a trough is formed between two unit bodies adjacent along the first direction by the first and second inclined surfaces.

3. The separator according to claim 2,
    wherein said trough has a "V" shape.

4. The separator according to claim 1,
    wherein the first inclined surface and the second inclined surface of each unit body are formed to have inclination angles different from each other.

5. The separator according to claim 1,
    wherein the first inclined surface and the second inclined surface of each unit body are formed to have areas different from each other.

6. The separator according to claim 1,
wherein each vertex portion is formed as a line.

7. The separator according to claim 1,
wherein each vertex portion is formed as a surface.

8. The separator according to claim 1,
wherein the connecting portion is provided to be bent at least twice or more.

9. The separator according to claim 1,
wherein the at least two adjacent inclined portions are formed for at least one of inclination angles and areas to be different from each other.

10. The separator according to claim 8,
wherein a first drain hole is formed in at least some regions of the connecting portion.

11. The separator according to claim 2,
wherein a second drain hole is formed in at least some regions of said trough.

12. A fuel cell stack comprising:
a membrane-electrode assembly;
a gas diffusion layer provided on one side of the membrane-electrode assembly; and
a separator disposed so that at least some regions of the separator are in contact with the gas diffusion layer,
wherein said separator comprises a plurality of unit bodies continuously arranged along a first direction and arranged apart at predetermined intervals along a second direction orthogonal to the first direction and a connecting portion connecting two unit bodies adjacent along the second direction,
wherein each of the unit bodies has a wedge shape having a first inclined surface and a second inclined surface, connected at a predetermined angle at a vertex portion,
wherein two unit bodies adjacent along the second direction are arranged so that their respective vertex portions are not coaxially located with respect to a virtual line parallel to the second direction, and
wherein the connecting portion comprises at least two inclined portions for connecting the first inclined surfaces of the two unit bodies adjacent along the second direction.

13. The fuel cell stack according to claim 12,
wherein each vertex portion in contact with said gas diffusion layer is formed as a line or a surface.

14. The fuel cell stack according to claim 12,
wherein the separator is disposed so that a reaction gas flows along the second direction.

15. The fuel cell stack according to claim 12,
wherein in the separator, a trough is formed between two unit bodies adjacent along the first direction by the first and second inclined surfaces.

16. The fuel cell stack according to claim 15,
wherein the connecting portion is provided to be bent at least twice or more.

17. The fuel cell stack according to claim 16,
wherein a drain hole for flow of condensed water is formed in at least one of the trough and the connecting portion.

18. The separator according to claim 1, wherein all of the unit bodies project in a same direction from a same side of the separator.

19. The fuel cell stack according to claim 12, wherein all of the unit bodies project in a same direction from a same side of the separator.

* * * * *